Feb. 28, 1939.　　　　A. L. SIMISON　　　2,148,510
STORAGE BATTERY-BOX COMPOSITION
Original Filed Jan. 31, 1935
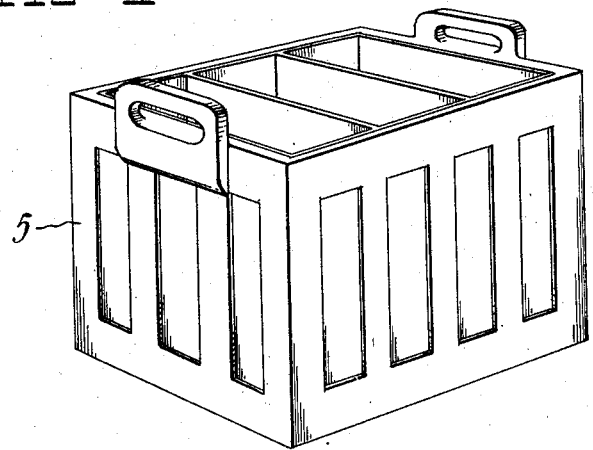
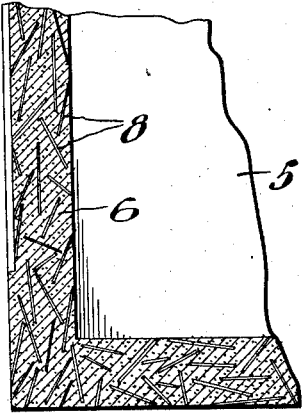
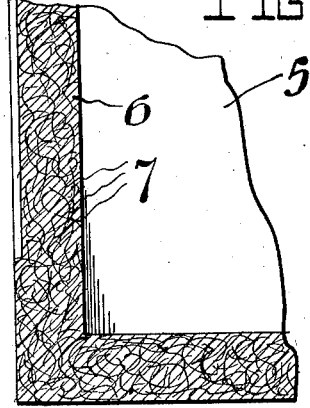
Allen L. Simison
INVENTOR.
BY J. F. Rule
ATTORNEY.

Patented Feb. 28, 1939

2,148,510

UNITED STATES PATENT OFFICE 2,148,510

STORAGE BATTERY-BOX COMPOSITION

Allen L. Simison, Newark, Ohio, assignor, by mesne assignments, to Owens-Corning Fiberglas Corporation, a corporation of Delaware Application January 31, 1935, Serial No. 4,421
Renewed May 12, 1938

1 Claim. (Cl. 106—2)

My invention relates to compositions comprising plastic materials with glass fibers intermixed therewith, such compositions being adapted for the manufacture of various molded articles and articles generally which are made of plastic materials. The fibrous glass may be supplied in bulk with the fibers matted or felted, and may be intermixed with the plastics to serve as a filler and strengthening material.

At the present time, wool cotton and kindred organic fibers are used to some extent in molded plastics as a strengthening material, but such use has not proved entirely satisfactory owing to the characteristic properties of such organic materials. They are readily attacked by acids, alkalis and other chemicals, are readily combustible, and have comparatively little tensile strength. In accordance with the present invention, fibrous glass in the form of wool, cotton or coarser fibers is employed in place of such organic materials, thereby overcoming the above objections by supplying a material which is chemically inert to acids and alkalis generally, is fire resistant, which possesses comparatively great tensile strength, and is otherwise particularly adapted for such use.

An object of the invention is to provide a plastic composition for molded articles, having incorporated therein a fibrous material which on account of its superior tensile strength and other characteristic properties, permits the plastic material to be made of ingredients which are comparatively inexpensive and light in weight, without sacrificing the necessary strength of the composition as a whole.

A feature of the present invention consists in obtaining the necessary strength and durability of the plastic composition as a whole, by the use of a relatively small proportion of the fibrous material, owing to its superior strength as compared with organic fibers used for a like purpose.

Other objects of the invention will appear hereinafter.

Referring to the accompanying drawing:

Fig. 1 is a perspective view of a molded battery cell or case made of plastic material in accordance with my invention.

Fig. 2 is a fragmentary sectional view illustrating the intermixture of glass fibers and plastic material.

Fig. 3 is a similar view of a modification in which comparatively coarse glass fibers are used.

Referring to the drawing, the molded battery case 5 which is shown as of conventional form, comprises a plastic material 6 with which are intermixed glass fibers 7 (Fig. 2) embedded in and distributed throughout the mass of plastic material.

The battery cell 5 may be molded from a plastic composition made from a batch comprising asphalt, coal dust, ground silica and glass fibers. The fibers may be in the form commonly known in the trade as glass wool and which consists of fine glass filaments in bulk or in loosely matted form. Good results have been obtained with the use of an amount of glass wool approximately one-fourth by weight of the entire batch. The proportion, however, may be varied within rather wide limits, depending upon the results desired, the fineness and length of the glass fibers, the specific composition of the plastic material, and other variable factors.

The composition above described as used for battery cells, differs substantially from the composition commonly used for such cells, which consists of asphalt, diatomaceous earth, ground silica and cotton linters. In accordance with the present invention, the amount of fibrous glass required is much less than the amount of cotton for which it is substituted, owing to the superior tensile strength of the glass fibers. The use of fibrous glass, owing to its greater strength, as compared with organic fibers, permits the use of coal dust or other comparatively inexpensive and light weight material as a substitute for the diatomaceous earth.

The batch may be mixed in an approved form of mixing apparatus, as, for example, a mixer substantially like those used in mixing dough for making bread. Such a mixer comprises a heated drum kept at about 350° F. by steam under pressure circulated in the walls of the mixer. The mixing is effected by angular beaters which are revolved within the mixer. The batch is placed in the mixer and worked or kneaded until the ingredients are thoroughly mixed. This may usually be accomplished in fifteen to twenty minutes. The time required for mixing the material is materially less than that required for mixing a batch comprising cotton linters or the like, because the glass has no absorption and usually is coarser fibered than the absorptive cotton linters.

The batch when mixed has a consistency similar to bread dough. When the mixing is completed, the batch is removed from the mixer and placed in a machine which extrudes the material in molded form convenient for handling. Slugs of this material of the proper weight are placed in a press mold by which the battery cases or other articles are molded under pressure. A pressure of 200 tons is ordinarily used in molding a battery case.

The fineness of the glass wool and the length of the individual fibers may be varied considerably. Very satisfactory results are obtained with glass in which the individual fibers in the finished product are approximately one-eighth to one-fourth inch in length and which are from one hundred to three hundred microns in diameter. Fibers of the length indicated, protect the asphalt or plastic composition against cracking or shattering under impact and also have a material strengthening effect in addition to toughening the mass against shattering.

A much finer glass wool, sometimes referred to as glass cotton, may be employed if desired. The individual fibers of this fine material may range from five microns or less in diameter upward, and the individual fibers may be of comparatively great length. The coarser material has the advantage of being comparatively inexpensive with present methods of manufacture.

The glass wool may be supplied in bulk form as an ingredient of the batch, and in the molded material is more or less interwoven or felted and uniformly intermixed throughout the entire mass, thereby giving it toughness and strength, preventing shattering or breakage.

Fig. 3 illustrates a modification in which the individual fibers 8 of glass are comparatively coarse and are not felted, matted or interwoven to the same extent as the finer fibers shown in Fig. 2.

Although I have illustrated a battery case by way of example of a molded article, it will be understood that the plastic composition herein described may be molded or fabricated into numerous other articles. Moreover, the specific composition or materials heretofore described, and compositions made by the particular method hereinbefore set forth, are given by way of example and not as limitations of the invention.

Another method of making a plastic composition in accordance with my invention, comprises matting or felting the fibrous glass, thereby giving it a predetermined form and then impregnating the formed fibrous mass with the plastic composition and thereby building up an article or mass of the material which may be molded or otherwise shaped.

Modifications other than those hereinabove particularly set forth may be resorted to within the spirit and scope of my invention, as defined by the appended claim.

I claim:

A storage battery case consisting of a molded plastic impervious material, said material comprising asphalt, coal dust, ground silica, and glass wool intermixed with and distributed throughout the mass of plastic material.

ALLEN L. SIMISON.